United States Patent [19]

Tartaglino

[11] Patent Number: 4,662,269
[45] Date of Patent: * May 5, 1987

[54] SELECTIVE ZONE ISOLATION FOR HVAC SYSTEM

[76] Inventor: Jerry J. Tartaglino, 4911 W. Hanover, Dallas, Tex. 75209

[*] Notice: The portion of the term of this patent subsequent to Jun. 11, 2002 has been disclaimed.

[21] Appl. No.: 730,836

[22] Filed: May 6, 1985

Related U.S. Application Data

[63] Continuation of Ser. No. 588,443, Mar. 12, 1984, Pat. No. 4,522,116.

[51] Int. Cl.$^4$ .............................................. F24F 11/00
[52] U.S. Cl. ..................................... 98/39.1; 98/41.1; 236/46 R; 251/61.1
[58] Field of Search .................. 98/39.1, 41.1; 165/12; 236/46 R, 49; 417/19, 44; 251/61.1

[56] References Cited

U.S. PATENT DOCUMENTS

| | | | |
|---|---|---|---|
| 2,598,207 | 5/1952 | Bailey et al. | 251/24 X |
| 3,320,750 | 5/1967 | Haise et al. | 251/5 X |
| 4,147,298 | 4/1979 | Leemhuis | 236/49 |
| 4,243,174 | 1/1981 | Moeller et al. | 236/49 X |

*Primary Examiner*—Harold Joyce
*Attorney, Agent, or Firm*—Glaser, Griggs & Schwartz

[57] ABSTRACT

An activity zone of a house is selectively isolated with respect to a sleeping zone during nighttime intervals by selectively blocking the flow of conditioned air into the activity zone, while allowing the usual flow of conditioned air into the sleeping zone. The air flow passage in each supply duct is blocked by an inflatable air bladder disposed within the air flow passage. An air compressor is coupled to the bladder for inflating it to cause it to expand against the sidewall of the duct and seal the air flow passage during the isolation mode of operation, and for drawing air from the bladder to cause it to collapse and open the air flow passage during the conditioned air supply mode of operation. In the preferred embodiment, operation of the compressor is coordinated by a timer and a solenoid controlled, four-way valve which ports pressurized air to the bladders during a preprogramed zone isolation interval, and directs the withdrawal of air from the bladders during a preprogramed conditioned air supply interval. A pressure responsive power switch applies operating power to the compressor in response to compressor discharge port pressure being less than the pressure level corresponding with a fully inflated air bladder, and removes operating power from the compressor in response to the compressor inlet port pressure being less than the pressure level corresponding with the air bladder being in the collapsed condition.

3 Claims, 5 Drawing Figures

SELECTIVE ZONE ISOLATION FOR HVAC SYSTEM

This is a continuation of application Ser. No. 06/588,443, filed Mar. 12, 1984 now U.S. Pat. No. 4,522,116.

BACKGROUND OF THE INVENTION

1. Field of the Invention:

This invention relates generally to energy management, and in particular to air flow control in a heating, ventilating and air conditioning system (HVAC) by selective zone isolation.

2. Description of the Prior Art:

Because of the rapidly rising costs of energy, the incentives to conserve are increasing, both for domestic users as well as industrial users. For most domestic users, home air conditioning and heating accounts for a substantial portion of the annual energy expense. Although most dwellings are insulated, a large amount of energy is expended by the air conditioning compressor to pump radiant heat absorbed by the dwelling structure out of the air conditioned living space to the outside ambient air. Likewise, a great deal of energy is expended by the furnace to replace heat energy which is lost through the walls and ceiling of the dwelling structure.

For energy conservation reasons, it is common practice to reduce the degree of cooling or heating during periods of minimum activity, for example at night, according to comfort requirements. For example, the ambient temperature in a home can be reduced at night while the occupants are asleep without causing any discomfort. Additionally, the temperature can be reduced substantially during the day when the dwelling is not occupied. Such reduction in the nighttime temperature of the dwelling is referred to as a "set-back" which results in a significant reduction in fuel consumption for heating and cooling the dwelling.

Although the night set-back thermostat provides energy savings, the air conditioning compressor or furnace is still subjected to the entire heat gain/loss loading of the dwelling, limited only by upward or downward (depending on the season) temperature drift through the entire home. Obvious comfort requirements restrict this drift and limits savings potential in many cases.

It has been common practice by homeowners to reduce energy costs by closing off certain rooms which are no longer in use. This is commonly carried out by closing the outlet vent of the supply duct for the room which is to be isolated. It will be appreciated that while this may be an acceptable method on a long term basis, it cannot be conveniently practiced on a daily basis. The requirement to manually close and open the vent is subject to human failure and neglect whereby cost savings are lost. Moreover, manual alteration of the vent opening is not entirely satisfactory since the isolated room will be uncomfortably cool or warm in the morning before its vent manually opened and, due to the lag time of typical heating and cooling systems, half an hour or more is usually required for room temperature to reach a comfortable level for normal daytime activities. Finally, most supply vents are located on the ceiling at an elevation which cannot be conveniently reached without the aid of a stepladder.

In some commercial installations, the flow of conditioned air through an air supply duct is regulated by a moveable damper plate. The position of the damper plate is established by a reversible drive motor as a function of air velocity through the supply duct and temperature of the air in the space being serviced. The mechanical damper assembly is not well suited for retrofit applications because of the extensive duct modification required and the expense of the damper motor and damper control. Moreover, the mechanical damper assembly is not suited for retrofit installations in some cases because of the lack of adequate working space around the supply ducts. Finally, the mechanical damper plate must have clearance along its edges to allow it to rotate within the damper. Thus, it cannot completely close off the air flow passage. In such installations, the mechanical damper plate modulates the conditioned air flow to accomodate temperature changes in the air space being serviced, rather than completely closing it off.

OBJECTS OF THE INVENTION

It is, therefore, the principal object of the present invention to conserve energy by selectively isolating an activity zone of a dwelling during periods of inactivity.

A related object of the invention is to provide selective zone isolation for an HVAC system which is suited for retrofit installation.

Another object of the invention is to provide an energy management system for dwellings which automatically opens and closes selected supply air ducts according to a preprogramed zone isolation and service schedule.

Yet another object of the invention is to provide apparatus for selectively sealing and opening a air duct which requires no structural modification of the air duct.

SUMMARY OF THE INVENTION

The activity zone of a house, including the living room, dining room, kitchen and game room are selectively isolated with respect to the sleeping zone of the dwelling during nighttime intervals by blocking the flow of conditioned air into the activity zone, while allowing the normal flow of conditioned air into the sleeping zone. Zone isolation is accomplished by blocking the air flow passage of HVAC air flow ducts which supply conditioned air to the activity zone. The air flow passage in each supply duct is selectively blocked by an inflatable air bladder which is inserted into the air flow passage. An air compressor is coupled to the bladder for inflating it to cause it to expand against the sidewall of the duct and seal the air flow passage during the isolation mode of operation, and for pumping air from the bladder to cause it to collapse and open the air flow passage during a conditioned air supply mode of operation.

In the preferred embodiment, operation of the compressor is coordinated by a solenoid controlled, four-way valve which ports pressurized air to the air bladders during the zone isolation mode, and directs the withdrawal of air from the air bladders during the conditioned air supply interval. Operating power for the compressor is provided by a pressure responsive power switch which applies operating power to the compressor in response to compressor exhaust port pressure being less than the pressure level corresponding with a fully inflated air bladder (duct closed), and which removes operating power from the compressor in response to the compressor inlet port pressure being less than the pressure level corresponding with the air bladder being in the collapsed condition (duct open). Power to the compressor is interrupted when the compressor exhaust port pressure exceeds the pressure level required to fully inflate the bladders, or when the compressor inlet port pressure drops below the pressure level required for complete collapse of the bladders.

Supply duct isolation is provided by an inflatable bladder which is adapted to be inserted into the air flow space of the duct. In the isolation mode of operation, the air bladder is inflated with pressurized air and expands against the inside sidewall surface of the air flow duct, thereby closing the air flow passage and blocking the flow of conditioned air. In the service mode of operation, air is pumped out of the bladder until it is completely collapsed, thereby opening the air flow passage of the supply duct and permitting the flow of conditioned air through the duct.

The bladder is inflated and deflated by the electrically driven compressor in cooperation with the four-way shuttle valve and a timer. The timer is preprogramed to actuate the shuttle valve during a zone isolation interval. During the isolation interval, the four-way valve connects the suction line of the compressor to draw ambient air and the high pressure exhaust port of the compressor to pressurize the air bladder. During a service interval, the timer actuation signal is removed, thereby allowing the four-way shuttle valve to shift and connect the input port of compressor to draw air from the pressurized bladders, while exhausting the air into the surrounding environment.

The air bladders are installed merely by inserting them into the supply air ducts which are to be selectively isolated. For retrofit applications, the only modification required is to cut a small access door and supply conduit feed-through opening in the main supply plenum housing. The air bladders are manually inserted through the access opening and into the designated supply ducts, and the air supply conduit is routed through the feed-through opening to the four-way valve.

The novel features which characterize the invention are set forth in the apended claims. The nature of the invention, however, as well as its essential features and advantages, will be more fully comprehended upon consideration of an illustrative embodiment, when read in conjunction with the accompaning drawings, wherein:

DETAILED DESCRIPTION OF THE PREFERRED EMBODIMENT

Figures 1, 2A, 2B:
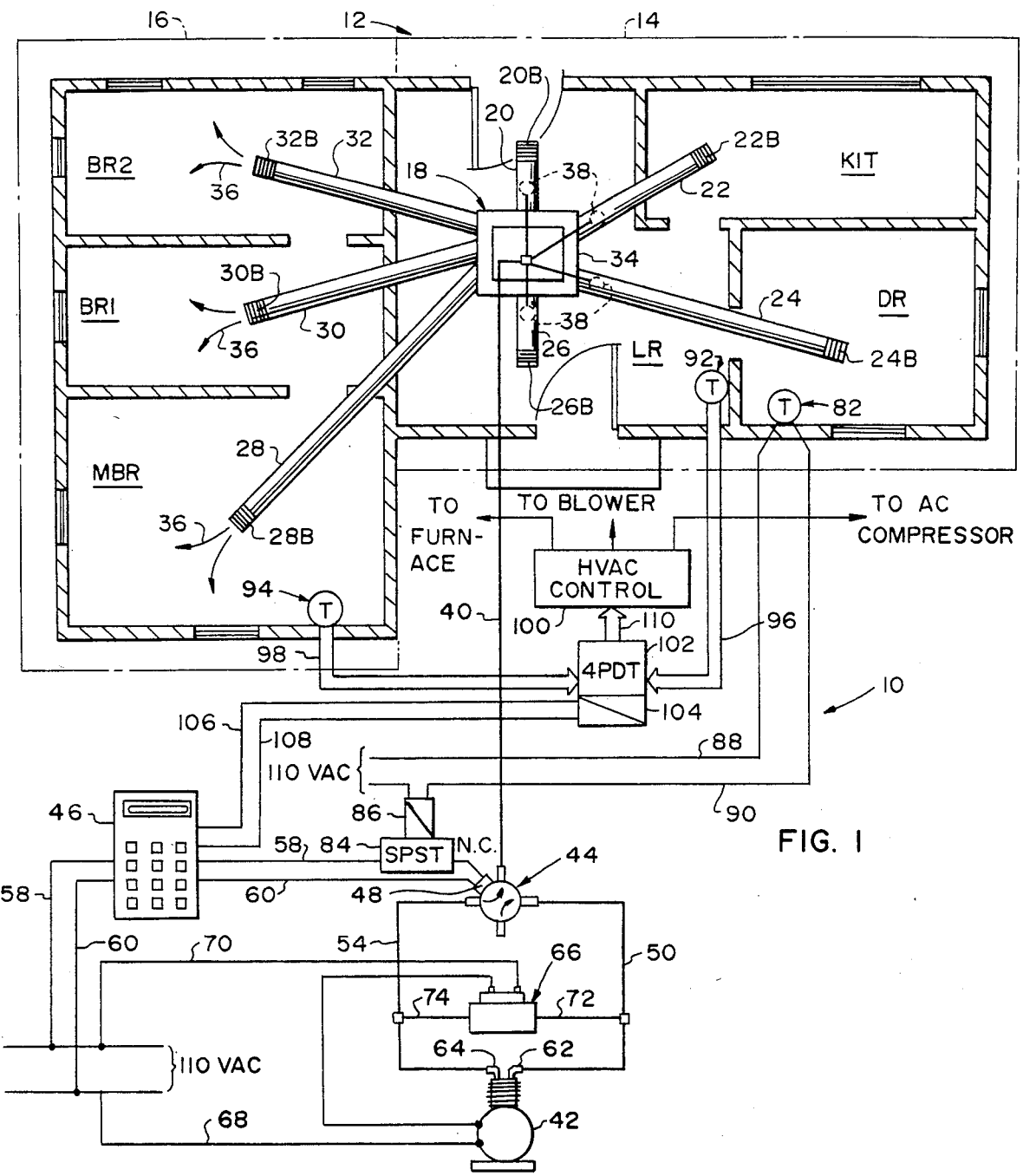
FIG. 1 is a simplified schematic diagram of a selective zone isolation system as installed in a dwelling.
FIG. 2A is a perspective view of a supply air duct having an air bladder pressurized to its fully expanded, duct closed condition.
FIG. 2B is a view similar to FIG. 2A in which the air bladder is collapsed in its duct open condition.

In the description which follows, like parts are marked throughout the specification and drawings with the same reference numerals, respectively. The figures are not necessarily drawn to scale and in some instances proportions have been exaggerated in order to more clearly depict certain features of the invention.

Refering now to FIG. 1, a selective zone isolation 10 is installed in a family dwelling 12. The family dwelling 12 includes an activity zone 14 and a sleeping zone 16. The activity zone comprises a living room (LR), a game room (GR), kitchen (KIT) and a dining room (DR), rooms which are utilized during the waking hours, typically 7 A.M.-10 P.M. The sleeping zone 16 comprises a master bedroom (MBR) and bedrooms (BR 1, BR 2). These rooms are utilized as sleeping areas, typically from 10 P.M. to 7 A.M.

The rooms of the activity zone 14 are ventilated and conditioned for comfort by a central heating and air conditioning system 18. The central HVAC system includes a furnace (not illustrated) and air cooling equipment, for example a compressor, condenser and evaporator (not illustrated). Conditioned air produced by the central HVAC unit 18 is circulated into the various rooms of the dwelling through supply ducts 22, 24, 26, 28, 30, and 32. Each supply duct has an inlet port connected to receive pressurized air from a distribution plenum 34 and has an outlet port for discharging the conditioned air into a living space through a mechanical vent. The inlet ports are designated 20A, 22A, 24A, 26A, 28A, 30A, 32A and the mechanical vents are designated 20B, 22B, 24B, 26B, 28B, 30B, 32B, respectively.

The distribution plenum 34 is charged with conditioned air 36 which is forced across a heat exchanger by a blower fan. During operation of the HVAC system, the conditioned air 36 is circulated intermittently through the supply ducts into the various rooms of the dwelling and is returned to the inlet port of the heat exchanger through return ducts (not illustrated).

According to an important aspect of the invention, energy is conserved by selectively interrupting the flow of conditioned air into the activity zone 14 during periods of inactivity, for example at nighttime, while permitting the flow of conditioned air into the sleeping zone 16. Zone isolation is accomplished by blocking each supply duct 20, 22, 24 and 26 with an inflatable air bladder 38. Referring to FIGS. 2A, 2B as typical installations, the air bladder 38 is inserted into the air flow passage 22C of conduit 22. The air bladder 38 is pressurized and deflated through an air conduit 40. In FIG. 2A, the air bladder is fully expanded against interior sidewall surface 22D of the supply duct 22. The air bladder 38 is constructed of an elastic material which permits it to conform with the geometry of the interior sidewall surface 22D. As the bladder 38 expands, it is driven into engagement with the interior sidewall 22D, thereby sealing the air flow passage 22C. In this fully inflated condition, the air bladder 38 blocks the flow of conditioned air 36 through the flow passage 22C, thus isolating the room (KIT) serviced by duct 22.

In FIG. 2B, the air bladder 38 is in its completely collapsed condition which is produced by drawing the air from the bladder 38 through conduit 40 until the air pressure within the bladder 38 is substantially below atmospheric pressure. In this duct open, collapsed bladder condition, conditioned air 36 is circulated freely through the flow passage 22C into the room being serviced during a preprogramed conditioned air service interval.

Figure 4:
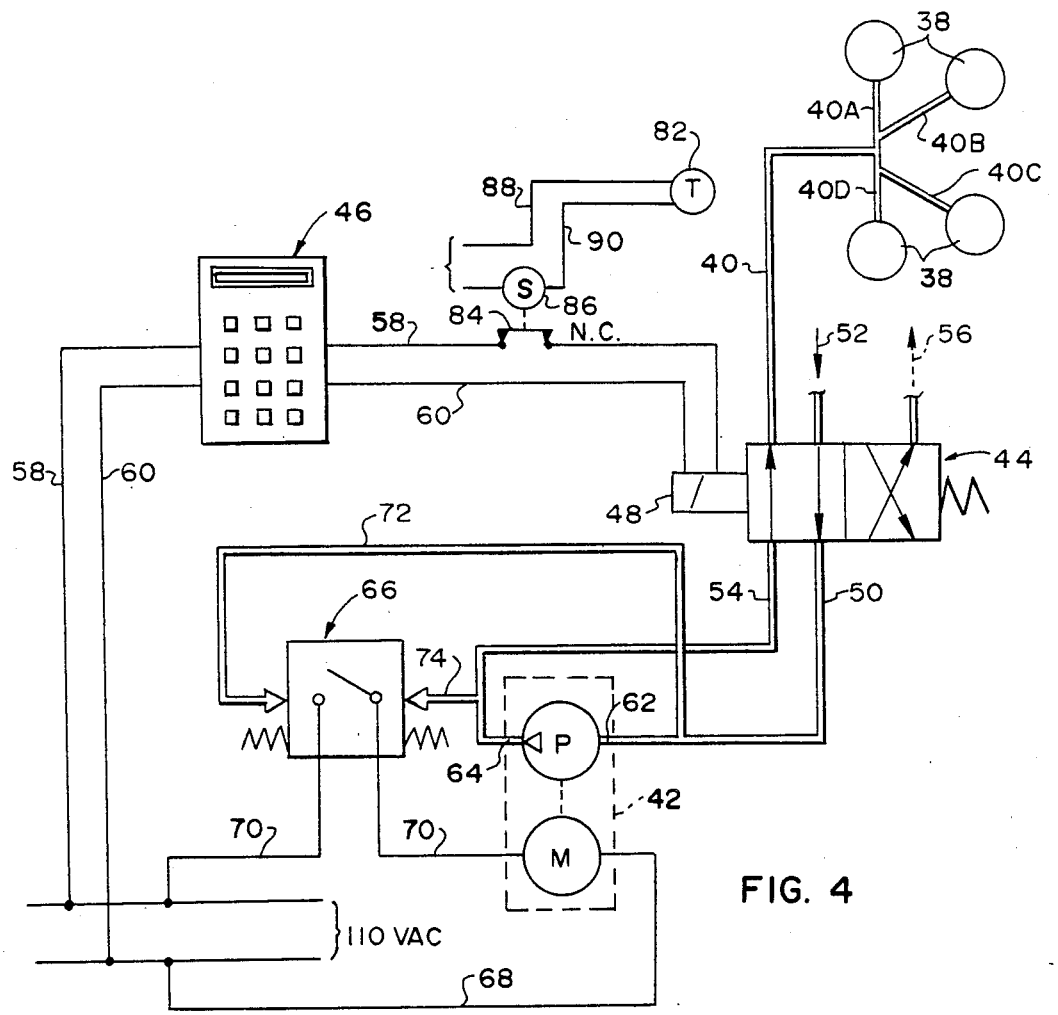

Referring now to FIGS. 1 and 4, each bladder 38 is inflated and deflated by an electrically driven compressor assembly 42 in cooperation with a four-way shuttle valve 44 and a multiple channel timer 46. The four-way shuttle valve 44 is mechanically shifted by an electrical solenoid 48. The four-way valve 44 is capable of operating in two modes, as schematically indicated in FIG. 4. As illustrated in FIG. 4, timer 46 energizes solenoid 48 during a zone isolation interval, with the four-way valve connecting the suction line 50 to draw ambient air 52 and with the high pressure exhaust line 54 connected to pressurize air supply conduit 40. During a conditioned air service interval, the timer de-energizes the solenoid 48, thereby allowing the four-way shuttle valve to shift and connect the suction line 50 to draw air from the bladders 38 through conduit 40, while exhausting the air 56 into the surrounding environment as it is pumped out of the bladders 38.

The timer 46 applies 110 VAC operating power to the solenoid 48 through conductors 58, 60 during the zone isolation interval. The operating power is derived from the 110 VAC supply. Other operating voltage levels, for example, 24 VAC, may be used to good advantage, according to the specific power requirements of the operating equipment and selected components.

Operating power for the compressor assembly 42 is also provided by the 110 VAC household supply. The compressor assembly 42 includes a pneumatic compressor P and an electrical drive motor M. The compressor P has an inlet port 62 to which the suction line 50 is connected, and an outlet port 64 to which the high pressure exhaust line 54 is connected. The electrical motor M receives its operating power from the 110 VAC household supply, through a pressure presponsive electrical switch 66. The electrical motor M is connected to the household supply through power conductor 68, 70 with the pressure responsive electrical switch 66 being connected in series with the motor M. Compressor operating power is selectively interrupted by the pressure responsive switch 66 in response to certain compressor exhaust port and compressor inlet port pressure conditions.

The pressure responsive power switch 66 has pressure sensing lines 72, 74 which are coupled to the compressor inlet port 62 and compressor exhaust port 64, respectively. The pressure responsive switch 66 is normally closed and opens only under high pressure or low pressure operating conditions. That is, when the pressure at the inlet port 62 of the compressor drops below the pressure level corresponding with the air bladders 38 being in the collapsed (duct open) condition, power to the compressor is interrupted. Additionally, when the discharge port pressure exceeds the pressure level required to fully inflate the bladders and close off the supply ducts, the switch 66 opens, thereby interrupting electrical power to the motor M.

Figure 3:
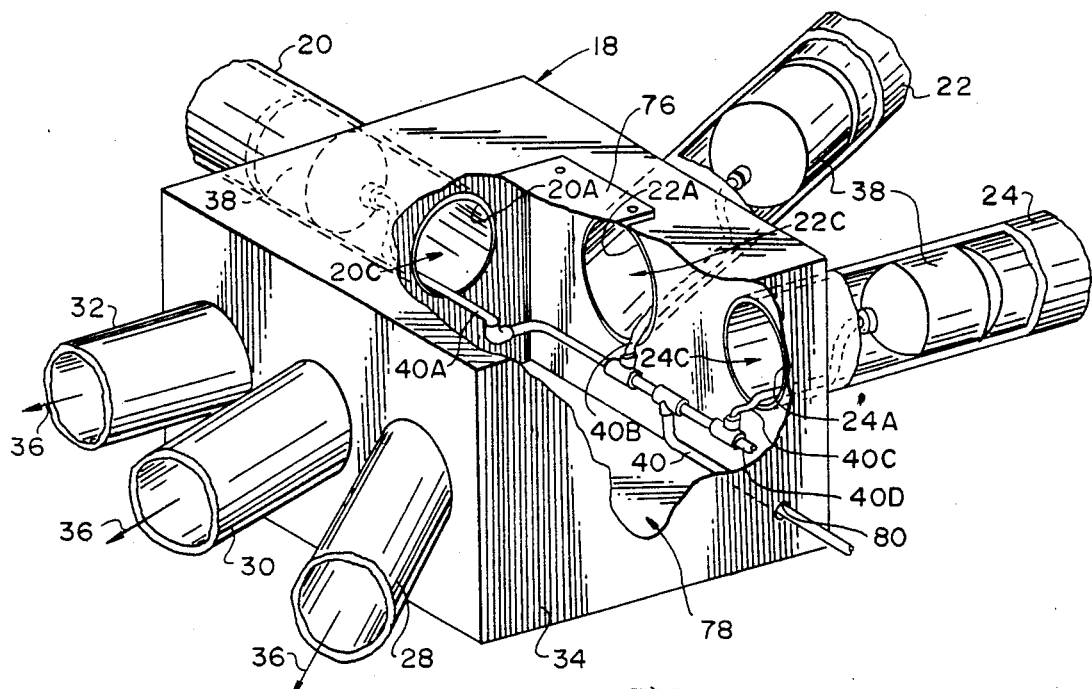
FIG. 3 is a perspective view of an air distribution plenum illustrating a typical installation of air bladders in supply conduits; and, FIG. 4 is a simplified electrical and pneumatic diagram of the selective zone isolation system shown in FIG. 1.

The pressure responsive power switch 66 is closed and applies operating power to the compressor compressor P in response to the compressor exhaust port pressure being less than the pressure level corresponding with the air bladders 38 being in the fully inflated and expanded condition as illustrated in FIG. 3, during a zone isolation interval. Operating power is also enabled to the compressor through the pressure responsive switch in response to the compressor compressor inlet port pressure being less than the pressure level corresponding with the air bladders 38 being in a collapsed, fully deflated condition as illustrated in FIG. 2B. Thus the compressor compressor assembly 42 is cycled on and off automatically to maintain the bladders 38 in the fully inflated condition, or in the collapsed condition. The compressor assembly 42 is automatically interrupted in response to an over pressure condition or an under pressure condition in the supply conduit 40.

The isolation zone 14 is protected against damaging temperature excursions by a high-low limit thermostat switch 82 and a solenoid controlled, single pole, single throw contactor 84. The contactor 84 is a single pole, single throw normally closed switch which is opened by a solenoid 86. The thermostat 82 is normally opened and closes in response to ambient temperature above or below a critical temperature level. For example, during the heating mode of operation, the therostat 82 may be set to close for temperatures below 40° F. When the HVAC system is operated in the cooling mode, the threshold level may be set for 90° F. The high-low thermostat 82 is connected in series electrical relation with the solenoid 86 and is, therefore, capable of conducting line current through its contacts. Power conductors 88, 90 couple the thermostat to the solenoid 86 and a source of operating power (not illustrated). When the temperature sensed by thermostat 82 reaches a predetermined extreme value, for example less than 40° F., it closes the series electrical circuit with the solenoid 86, thereby actuating the normally closed contactor 84, and interrupting the supply of operating power to solenoid 48. When solenoid 48 is de-energized, the shuttle valve 44 shifts and connects the inlet and exhaust conduits 50, 54 to draw air 56 from the bladders 38 and discharge it into the surrounding environment. When the bladders 38 have been completely deflated, the air passages through each supply duct are opened, thereby allowing the circulation of conditioned air. After the ambient temperature of zone 14 rises to a safe temperature level, thermostat 82 opens, thereby allowing the bladders 38 to reinflate and return zone 14 to the isolated condition. High temperature limit operation occurs in the same manner.

Referring again to FIG. 3, an access door is cut into the top of the plenum 34 and is sealed by a removeable cover door 76. In a retrofit installation, the door 76 is removed, thereby providing access to the plenum chamber 78 and the inlet ports 20A, 22A, 24A, and 26A. The air bladders 38 are installed in their completely collapsed condition by inserting them through the access door opening and into the flow passages of the selected supply ducts 20, 22, 24, and 26. The inflatable bladders 38 are separately coupled to the supply conduit 40 by conduit coupling sections 40A, 40B, 40C and 40D, respectively. The supply conduit 40 is routed through a small feed-through opening 80 formed in the plenum housing 34. The feed-through opening 80 is sealed after installation is completed.

The timer 46 can be located at any convenient wall location, for example adjacent the system thermostat, and the compressor, shuttle valve and pressure switch can be located in the attic.

In the preferred embodiment, separate system thermostats 92, 94 are mounted in the activity zone 14 and the sleeping zone 16, respectively. The system thermostat 92 controls the operation of the HVAC unit 18 during daylight hours, typically 7 A.M.–10 P.M. The thermostat 94 located in the sleeping zone 16 controls the HVAC unit 18 during nighttime hours, typically 10 P.M.–7 A.M. Control conductors 96 leading from system thermostat 92 and control conductors 98 leading from system thermostat 94 are selectively coupled to HVAC control circuit 100 by a solenoid actuated four pole, double throw relay 102. The relay 102 is actuated by an electrical solenoid 104 in response to actuating current conducted by the multi-channel timer 46 through power conductors 106, 108. At a preselected time, for example 6 A.M., the multi-channel timer 46 conducts actuating current to solenoid 104, thereby causing relay 102 to switch its output control conductors 110 from the nighttime system thermostat 94 to the daytime system thermostat .92. Then, at 10:30 P.M., when the programed interval in timer 46 has elapsed, the solenoid 104 is de-energized, thereby turning control of HVAC unit 18 to the nighttime thermostat 94.

It is desirable to exercise control of the HVAC unit 18 with dual system thermostats so that the isolation zone will quickly return to a comfortable temperature, at least by the time that daytime activities begin. Additionally, during the heating season, the occupants of the dwelling would welcome an additional flow of warm air brought about by switching the system control to the activity zone thermostat. This will cause a momentary rise in temperature in the conditioned sleeping zone 16. However, during the cooling season, an additional flow of conditioned cool air would not be as welcome during the early morning hours since body temperature drops during sleep. Therefore, during the cooling season, the timer 46 is programed to switch system control to the activity zone thermostat 92 to coincide with the end of the sleeping period.

Although a preferred embodiment of the invention has been described in detail, it should be understood that various changes, substitutions and alterations can be made therein without departing from the spirit and scope of the invention as defined by the appended claims.

What is claimed is:

1. Apparatus for opening and closing an air flow duct of the type having a tubular sidewall surrounding an air flow passage, said apparatus comprising, in combination:

an inflatable air bladder for insertion into the air flow passage, said bladder being adapted to expand against the sidewall of said duct when pressurized and to retract from the sidewall and assume a minimum profile, collapsed condition when evacuated to a pressure less than ambient atmospheric pressure;

pumping means coupled to said bladder for inflating said bladder with pressurized air to cause it to expand against the sidewall and seal the air flow passage during an isolation interval, and for pumping air out of said bladder until its interior pressure is less than ambient atmospheric pressure to cause it to collapse to the minimum profile condition and open the air flow passage during a supply interval; and, power switching means coupled to said pumping means enabling operation of said pumping means in response to the interior air pressure of said air bladder being less than a first pressure level corresponding with the inflation pressure of said bladder when it is in the expanded, duct sidewall engaging condition, and for inhibiting operation of said pumping means (a) in response to the inflation pressure of said bladder being greater than said first pressure level, or (b) in response to the collapsed pressure of said bladder being less than a second pressure level below ambient atmospheric pressure corresponding with the vacuum pressure of said bladder when it is in the evacuated, minimum profile condition.

2. An energy management system for use in combination with an air supply duct having air flow passage comprising, in combination:

an inflatable air bladder for insertion into the air flow passage, said bladder being adapted to expand against said duct when pressurized and to retract from said duct when depressurized;

pneumatic power means coupled to said bladder for inflating said bladder with pressurized air to cause it to expand against said duct and seal the air flow passage in an isolation mode of operation, and for pumping air from said bladder until its interior pressure is reduced to a predetermined vacuum pressure level less than ambient atmospheric pressure to cause it to assume a minimum profile, collapsed condition and open the air flow passage in a supply mode of operation;

an actuator coupled to said pneumatic power means for selectively rendering said pneumatic power means operable in said isolation mode and in said supply mode of operation; and, power switching means coupled to said pneumatic power means enabling operation of said pneumatic power means in response to the interior air pressure of said air bladder being less than a first pressure level corresponding with the inflation pressure of said bladder when it is in the expanded, duct engaging condition, and for inhibiting operation of said pumping means (a) in response to the inflation pressure of said bladder being greater than said first pressure level, or (b) in response to the collapsed pressure of said bladder being less than a second pressure level below ambient atmospheric pressure corresponding with the vacuum pressure of said bladder when it is in the collapsed, minimum profile condition.

3. Apparatus for opening and closing the air flow passage of an air flow duct comprising, in combination:

an inflatable air bladder for insertion into the air flow duct, said bladder being adapted to engage the air flow duct and close the air flow passage when expanded, and to assume a minimum profile condition and open the air flow passage when collapsed and evacuated;

an air pump having inlet and discharge ports;

valve means for selectively coupling said bladder in fluid communication with said pump in a bladder pressurizing mode and in fluid communication with ambient atmosphere in a bladder evacuation mode, said valve means having a first port coupled to ambient atmosphere, a second port coupled to the pump discharge port, a third port coupled to the pump inlet port and a fourth port coupled to said bladder, the first valve port being connected in fluid communication with the third valve port and the second valve port being connected in fluid communication with the fourth valve port in the bladder pressurizing mode, and the first valve port being connected in fluid communiction with the second valve port and the third valve port being connected in fluid communication with the fourth valve port in the bladder evacuation mode;

actuating means coupled to said valve means for selectively rendering said valve means operable in the bladder pressurizing mode and in the bladder evacuation mode; and, pressure responsive power switching means coupled to said pump for enabling operation of said air pump in response to the pump discharge port pressure being less than a first pressure level corresponding with the inflation pressure of said bladder when it is in the expanded, duct closed condition, and for inhibiting operation of said pump (a) in response to the pump discharge port pressure being greater than said first pressure level, or (b) in response to the pump inlet port pressure being less than a second pressure level below ambient atmospheric pressure corresponding with the vacuum pressure of said bladder when it is in the collapsed, minimum profile duct open condition.

* * * * *